US009991787B2

United States Patent
Zhang et al.

(10) Patent No.: US 9,991,787 B2
(45) Date of Patent: *Jun. 5, 2018

(54) FAST STARTUP CONTROL CIRCUIT FOR SWITCH MODE POWER SUPPLY

(71) Applicant: SHANGHAI SIM-BCD SEMICONDUCTOR MANUFACTURING CO., LTD., Shanghai (CN)

(72) Inventors: Meiling Zhang, Shanghai (CN); Xiaoru Gao, Shanghai (CN); Chao Chen, Shanghai (CN); Yajiang Zhu, Shanghai (CN)

(73) Assignee: SHANGHAI SIM-BCD SEMICONDUCTOR MANUFACTURING CO., Ltd., Shanghai (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/652,226

(22) Filed: Jul. 17, 2017

(65) Prior Publication Data

US 2017/0317577 A1 Nov. 2, 2017

Related U.S. Application Data

(63) Continuation of application No. 15/048,890, filed on Feb. 19, 2016, now Pat. No. 9,748,834, which is a
(Continued)

(30) Foreign Application Priority Data

Aug. 29, 2012 (CN) .......................... 2012 1 0313484

(51) Int. Cl.
*H02M 1/36* (2007.01)
*H02M 3/335* (2006.01)

(52) U.S. Cl.
CPC ......... *H02M 1/36* (2013.01); *H02M 3/33523* (2013.01)

(58) Field of Classification Search
CPC ... H02M 1/08; H02M 1/36; H02M 2001/0003
(Continued)

(56) References Cited

U.S. PATENT DOCUMENTS 9,293,981 B2 * 3/2016 Zhang ............... H02M 3/33523
9,748,834 B2 * 8/2017 Zhang ............... H02M 3/33523
(Continued)

*Primary Examiner* — Jeffrey Sterrett

(57) ABSTRACT

A control circuit for a switch mode power supply (SMPS) includes a power switch for coupling to a primary winding of the power supply and a startup resistor coupled to an external input voltage and to a control terminal of the power switch. The control circuit also includes a controller. During startup, the controller is configured to cause the power switch to amplify a startup current from an external input voltage through the startup resistor and provide a startup power to the controller. During normal operation, the controller is configured to provide a power switch control signal to turn on and off the power switch for controlling a current flow in the primary winding and regulating an output of the power supply. The controller is configured to provide a current signal for driving an NPN power switch and to provide a voltage signal for driving an NMOS power switch.

14 Claims, 5 Drawing Sheets

Related U.S. Application Data continuation of application No. 14/013,028, filed on Aug. 28, 2013, now Pat. No. 9,293,981.

(58) Field of Classification Search
USPC .................................................. 363/49, 97
See application file for complete search history.

(56) References Cited

U.S. PATENT DOCUMENTS

| | | | | |
|---|---|---|---|---|
| 2010/0103705 A1* | 4/2010 | Fang | ................ | H02M 3/33507 363/21.18 |
| 2010/0259952 A1* | 10/2010 | Zhu | ................ | H02M 1/36 363/20 |
| 2011/0096573 A1* | 4/2011 | Zhu | ................ | H02M 3/33523 363/21.17 |
| 2011/0122659 A1* | 5/2011 | Duan | ................ | H02M 3/33507 363/21.16 |
| 2011/0261596 A1* | 10/2011 | Zong | ................ | H02M 3/33507 363/21.13 |
| 2012/0056551 A1* | 3/2012 | Zhu | ................ | H02M 1/4258 315/232 |
| 2013/0088898 A1* | 4/2013 | Gao | ................ | H02M 3/335 363/21.16 |
| 2013/0343095 A1* | 12/2013 | Zhu | ................ | H02M 1/4258 363/21.01 |
| 2013/0343101 A1* | 12/2013 | Zhang | ................ | H02M 3/33523 363/21.18 |
| 2014/0016375 A1* | 1/2014 | Gao | ................ | H02M 3/33523 363/21.16 |
| 2016/0087523 A1* | 3/2016 | Liu | ................ | H02M 1/4208 363/21.12 |
| 2016/0172964 A1* | 6/2016 | Zhang | ................ | H02M 3/33523 363/21.16 |
| 2016/0190938 A1* | 6/2016 | Wang | ................ | H02M 3/33507 363/21.12 |
| 2016/0241068 A1* | 8/2016 | Zhao | ................ | H02J 7/0052 |
| 2017/0317577 A1* | 11/2017 | Zhang | ................ | H02M 1/36 |

* cited by examiner

FAST STARTUP CONTROL CIRCUIT FOR SWITCH MODE POWER SUPPLY

CROSS-REFERENCES TO RELATED APPLICATIONS

This application is a continuation application of U.S. patent application Ser. No. 15/048,890, filed Feb. 19, 2016, which is a continuation application of U.S. patent application Ser. No. 14/013,028, filed Aug. 28, 2013, now U.S. Pat. No. 9,293,981, which claims priority to Chines Patent Application No. 201210313484.6, filed Aug. 29, 2012, which claims priority to Chines Patent Application No. 201110251283.3, filed Aug. 29, 2011, both of which are commonly owned and incorporated by reference herein.

BACKGROUND OF THE INVENTION

The present invention relates generally to the field of switch mode power supply (SMPS). More particularly, the present invention relates to power supply control circuits that have a fast startup time.

In 1955, an American G. H. Roger invented the self-oscillation push-pull transistor single transformer DC-DC converter, which was the beginning of high-frequency switching conversion control circuit. In 1957, Jensen invented the self-oscillating push-pull dual transformers. In 1964, U.S. scientists proposed the abolition of frequency transformer series switching power supply, which pointed to a fundamental way of decreasing the size and weight of power supplies. By 1969, because of improved components, such as higher voltage tolerance of high-power silicon transistors and shortened reverse recovery time of diodes, 25 kHz switching power supplies were realized.

Currently, switching power supply products have been widely used, because of their small size, light weight, and high power conversion efficiency. For example, they are used in industrial automation and control, military equipment, scientific equipment, LED lighting, industrial equipment, communications equipment, electrical equipment, instrumentation, medical equipment, semiconductor cooling and heating, air purifiers, electronic refrigerator, LCD display, audio-visual products, security, computer chassis, digital products, equipment, and other fields.

For switching power supplies, the start time is one of the important parameters. Along with the extensive application of switching power supply, fast startup time is becoming more and more desirable to the users. As explained below, conventional methods of achieving faster startup time has many drawbacks.

BRIEF SUMMARY OF THE INVENTION

The present invention relates generally to the field of switch mode power supply (SMPS). More particularly, embodiments of the invention disclose a switching power supply circuit having a fast startup time. Convention techniques for reducing startup time are not desirable. For example, using a smaller startup resistor can speed up the startup process, but it increases power consumption. Alternatively, using a smaller startup capacitor may help to reduce the startup time, but it may not provide sufficient operating power. In embodiments of the present invention, the faster startup is achieved without altering other desirable circuit parameters such as startup resistor or startup capacitor. In an embodiment, a startup resistor is connected to an input of a power switch. During startup, the controller is configured to cause the power switch to amplify a startup current from an external input voltage through the startup resistor and provide a startup power to the controller. During normal operation, the controller is configured to provide a power switch control signal to turn on and off the power switch for controlling a current flow in the primary winding and regulating an output of the power supply. In embodiments of the present invention, the amplification of the power switch is used to amplify the startup current and speed up the startup process.

According to an embodiment of the present invention, a controller for a switch mode power supply (SMPS) includes a first terminal for coupling to a startup resistor and to a control terminal of a power switch which is coupled to a primary winding of the power supply. During startup, the controller is configured to cause the power switch to amplify a startup current from an external input voltage through the startup resistor and provide a startup power to the controller. During normal operation, the controller is configured to provide a power switch control signal to turn on and off the power switch for controlling a current flow in the primary winding and regulating an output of the power supply. In a specific embodiment, the controller is implemented in a single integrated circuit (IC).

In an embodiment of the controller, during startup, the controller is configured to provide a current path for the amplified startup current to flow from an output of the power switch to charge up a startup capacitor and to provide the startup power to the controller, while isolating the power switch from a regulating function and a current sensing function. During normal operation, the controller is configured to separate the power switch from the startup capacitor by a rectifying diode. The controller is configured to provide the power switch control signal by amplifying a pulsed control signal from a pulse signal generation circuit.

In another embodiment, the controller also includes a second terminal for coupling to an output terminal of the power switch, a third terminal for coupling to the startup capacitor, a fourth terminal for coupling to a current sense resistor, a transistor coupled between the second terminal and the fourth terminal. During startup, the transistor is turned off to isolate the power switch from the current sense resistor, and a rectifying diode coupled between the second terminal and the third terminal to separate the power switch from the startup capacitor during normal operation.

In another embodiment, the controller further includes a pulse generation circuit for providing a pulsed control signal, an RC pump circuit including a resistor coupled to a capacitor at a common node. The resistor is coupled to a first bias voltage, and the capacitor is configured to receive the pulsed control signal. The controller also has a drive transistor having a gate coupled to the common node, and a source of the drive transistor coupled to the power switch to control the power switch for regulating an output of the power supply. In a specific embodiment, the controller also has a current mirror coupled between the drive transistor and a voltage supply and a switch transistor coupled between the drive transistor and a ground. In another embodiment, the power switch is either an NPN power switch or an NMOS power switch, wherein the controller is configured to provide a current signal for driving the NPN power switch, and the controller is also configured to provide a voltage signal for driving the NMOS power switch.

In another embodiment of the controller, the pulse generation circuit for providing a PWM (pulse width modulation) control signal. In yet another embodiment, the pulse generation circuit for providing a PFM (pulse frequency modulation) control signal.

According to another embodiment of the present invention, a control circuit for a switch mode power supply (SMPS) includes a power switch for coupling to a primary winding of the power supply and a startup resistor coupled to the external input voltage and also coupled to a control terminal of the power switch. The control circuit also includes a controller. During startup, the controller is configured to cause the power switch to amplify a startup current from an external input voltage through the startup resistor and provide a startup power to the controller. During normal operation, the controller is configured to provide a power switch control signal to turn on and off the power switch for controlling a current flow in the primary winding and regulating an output of the power supply.

According to another embodiment of the present invention, a switch mode power supply includes a transformer having a primary winding, a secondary winding, and an auxiliary winding. The primary winding is configured for coupling to an external input voltage, and the secondary winding is configured for providing an output of the power supply to a load. The power supply also includes a power switch for coupling to a primary winding of the power supply. The power supply further includes a startup resistor coupled to the external input voltage, and the startup resistor is also coupled to a control terminal of the power switch. In an embodiment, the power supply also has a startup capacitor coupled to an output terminal of the power switch.

In an embodiment, the above power supply also includes a controller. During startup, the controller is configured to cause the power switch to amplify a startup current from an external input voltage through the startup resistor and provide a startup power to the controller. During normal operation, the controller is configured to provide a power switch control signal to turn on and off the power switch for controlling a current flow in the primary winding and regulating an output of the power supply.

According to yet another embodiment of the present invention, a controller is provided for a switch mode power supply (SMPS) having a power switch coupled to a primary winding for regulating an output of the power supply. The controller is configured to provide a current signal for driving an NPN power switch, and the controller is also configured to provide a voltage signal for driving an NMOS power switch. In an embodiment, the controller includes a pulse generation circuit for providing a pulsed control signal, an RC pump circuit including a resistor coupled to a capacitor at a common node. The resistor is coupled to a first bias voltage, and the capacitor is configured to receive the pulsed control signal. The controller also has a drive transistor having a gate coupled to the common node, and a source of the drive transistor is coupled to the NPN or NMOS power switch for providing the current signal or the voltage signal, respectively, for regulating an output of the power supply. In a specific embodiment, the controller also includes a current mirror coupled between the drive transistor and a voltage supply, and a switch transistor coupled between the drive transistor and a ground. In an embodiment of the controller, the power switch is either an NPN power switch or an NMOS power switch.

A further understanding of the nature and advantages of the present invention may be realized by reference to the remaining portions of the specification and the drawings.

DETAILED DESCRIPTION OF THE INVENTION

Figure 1:
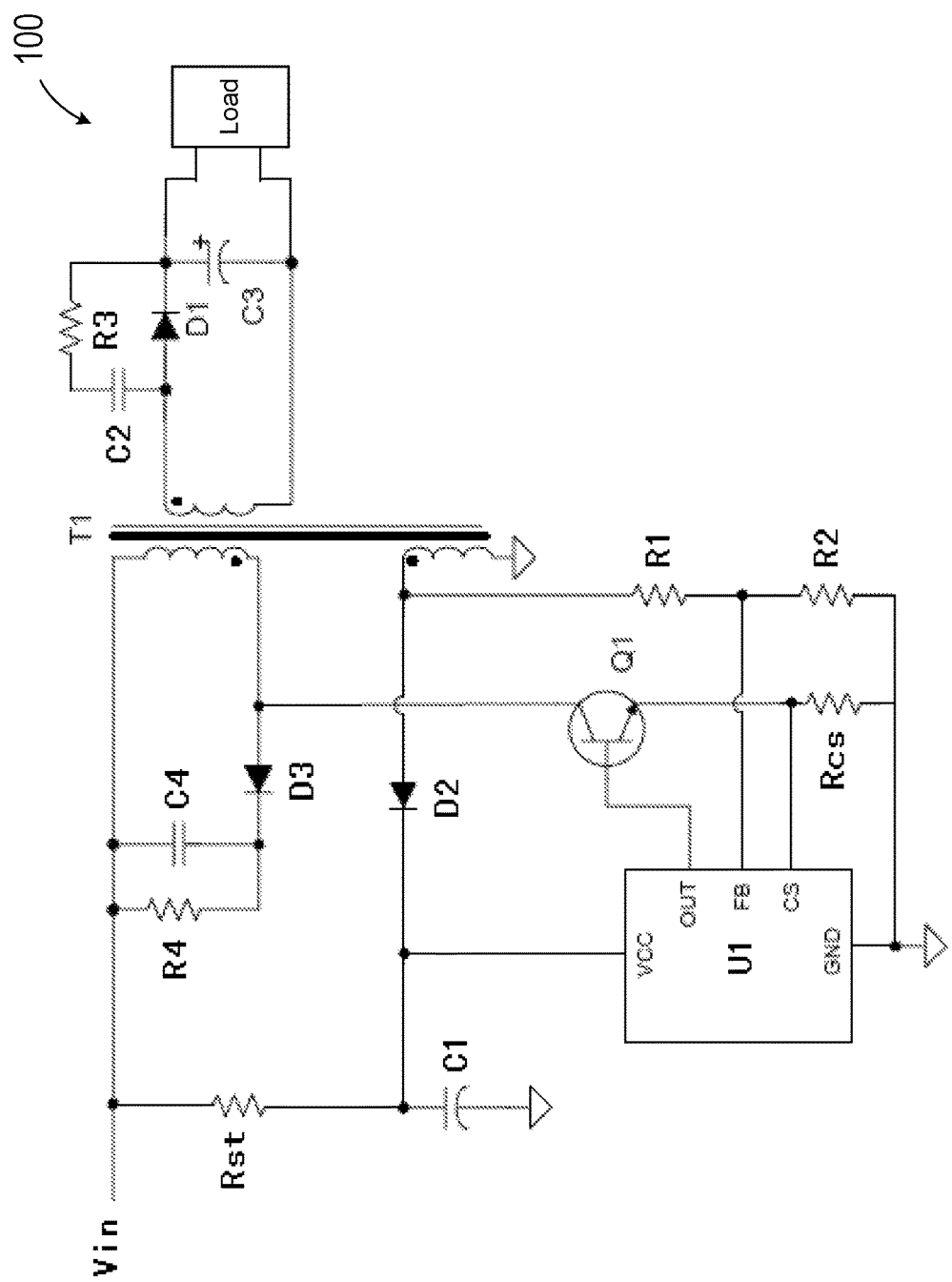
FIG. 1 illustrates a conventional flyback power supply circuit.

FIG. 1 illustrates a conventional flyback power supply circuit. As shown, power supply circuit 100 includes a primary-side controller U1. At startup, a controller supply voltage VCC capacitor C1 is charged by an input voltage Vin (from an external power supply) through a startup resistor Rst. When VCC reaches a turn-on voltage of primary-side controller U1, the primary controller U1 begins normal operation and outputs a switch control signal to drive an external power switch Q1. Diode D3, capacitor C4, and resistor R4 together form an RCD buffer circuit to reduce the transformer T1 leakage induced voltage spikes, to prevent breakdown and damage of power switch Q1. A resistor Rcs is in series connection with the emitter of power switch Q1 and is used for controlling transformer T1 primary inductor peak current, thus the maximum output power in the circuit. Capacitor C2 and resistor R3 form a buffer to remove the oscillation caused when the rectifier diode D1 is turned off. The FB terminal of the primary-side controller U1 is connected to auxiliary winding voltage divider resistors R1 and R2 to form a feedback network, and by the feedback control of the network, changes the switch or duty cycle of the control signal to automatically regulate the output voltage of the power supply.

The startup time for the circuit shown in FIG. 1 can be expressed as follows:

$$t = -R_{st} \times C_1 \times \ln\left(1 - \frac{V_{CC}}{V_{in}}\right)$$

Alternatively, the startup time can also be expressed as $$t = \frac{C_1 \times V_{CC}}{I_{st}}$$

where $I_{st}$ is the starting current, whose magnitude is determined by the value of the voltage across the starting resistor $R_{st}$ divided by the resistance of the startup resistor $R_{st}$.

The value of the starting voltage is constant. According to the above formula, therefore, to reduce the startup time, or increase the startup circuit speed, one can either reduce the startup resistor Rst (increase the starting current), or reduce the capacitance to of $C_1$. However, in practical applications, decreasing the VCC capacitance of the primary-side controller U1 is not desirable. Because reducing the capacitance will cause the supply voltage variation to increase, which may cause the control circuit to enter an under voltage lock out (UVLO) condition, which is a threshold voltage in a protection mode indicating that the power supply voltage is insufficient to ensure the integrated circuit are not damaged. Moreover, the other alternative, simply reducing the startup resistor Rst resistance to improve the startup speed is also not desirable. This is because a current flows through startup resistor Rst both during the IC startup or normal operation. If the resistance of Rst is reduced, it will increase the IC power consumption during normal operation, thus reducing the efficiency of the system. Thus, it is desirable to improve the startup speed without changing the existing circuit performance conditions.

In conventional power supply circuits, during startup, the power switch Q1 does not function, and therefore, its amplification capability is not utilized. Embodiments of the present invention provide a control circuit for a switch mode power supply that uses the amplification function of the power switch to amplify the startup current, and thereby speed up the startup process.

Figure 2:
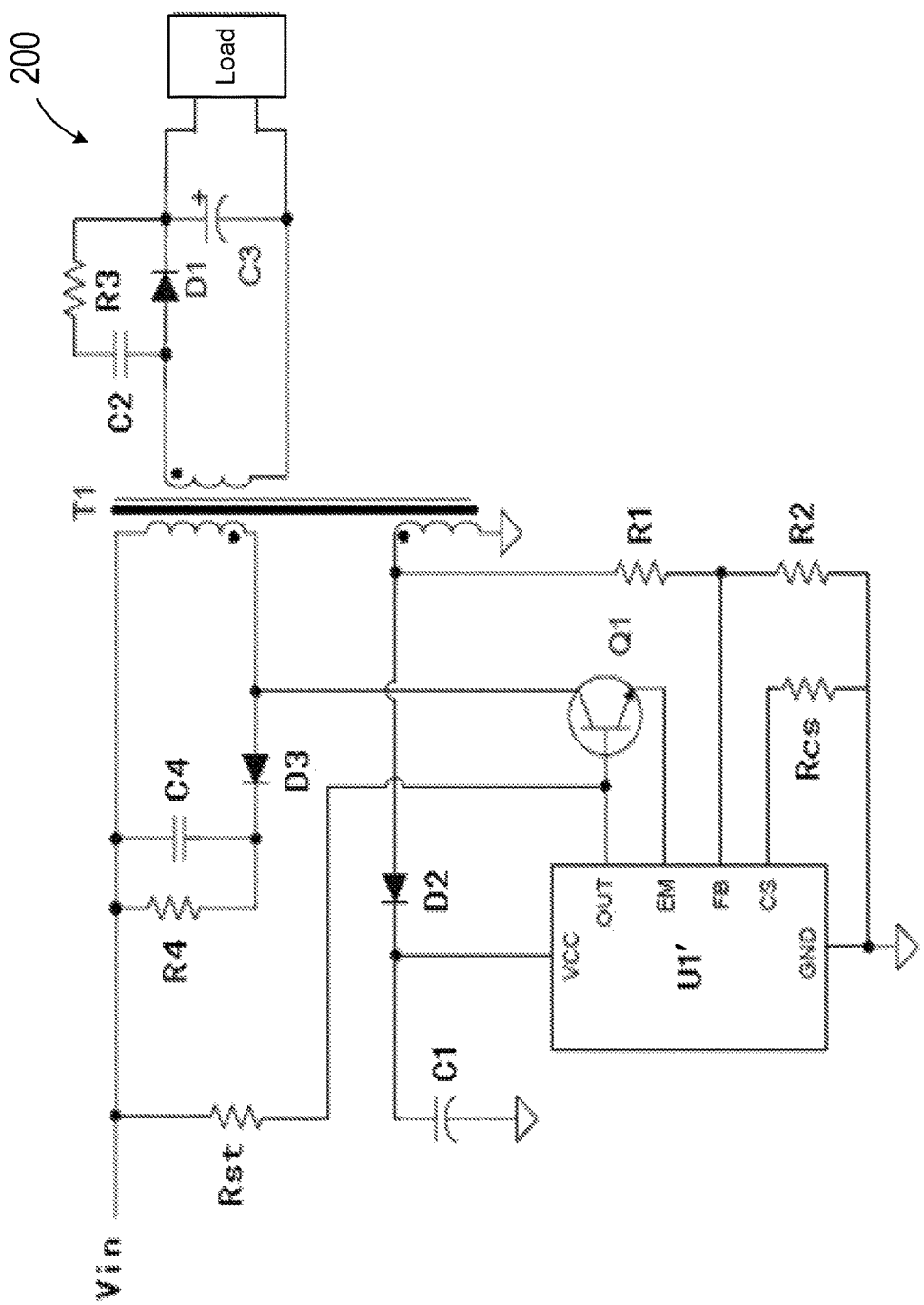
FIG. 2 illustrates a switching power supply according to an embodiment of the present invention.

FIG. 2 illustrates a switching power supply according to an embodiment of the present invention. As shown, a switching power supply, or switch mode power supply (SMPS), 200 includes many components similar to power supply 100 of FIG. 1. The similar components are not described in detail here. For example, power supply 200 includes a primary side controller U1' coupled to a power switch Q1. Power switch Q1 is also coupled to a primary winding of transformer T1, which is connected to an external power source through input terminal Vin. Switching power supply circuit 200 further includes a buffer circuit for reducing the leakage inductance of the transformer T1 to avoid breakdown caused by the peak voltage in power switch Q1. The buffer circuit includes a resistor R4 connected in parallel to a capacitor C4, and a diode D3 connected in series with R4 and C4. Diode D3 is also connected to the primary winding of the transformer T1 and the collector of the power switch. The parallel combination of resistor R4 and capacitor C4 is connected to the input power source Vin. Switching power supply circuit 200 further includes a voltage divider of resistors R1 and R2 connected to an auxiliary winding and providing a feedback signal to terminal FB of controller U1'. By the feedback control of the network, controller U1' can change the switching period or duty cycle of the control signal to automatically regulate the output voltage.

It is noted that in the embodiment described herein controller U1' includes a PWM (pulse width modulation) control circuit. In this embodiment, controller U1' can change the pulse width or duty cycle of the control signal to automatically adjust the output voltage. However, it is understood that other types of switching power control circuit can also be used. For example, in PFM (pulse frequency modulation) control, controller U1' can change the pulse frequency or the switching period of the control signal to automatically regulate the output voltage.

As shown in FIG. 2, a startup resistor Rst is connected to Vin and also to the base of power switch Q1. The emitter of power switch Q1 is coupled to an EM terminal of primary-side controller U1'. As described in more detail below in connection with FIG. 3, in controller U1', terminal EM is connected through a diode to a VCC terminal of U1', which is configured to be coupled to a startup capacitor C1 for providing operating power to controller U1'. During the startup phase, a startup current through resistor Rst is amplified by power switch Q1. The diode allows the amplified startup current to flow to the VCC terminal of U1' to facilitate fast startup. When the startup is completed (i.e., when VCC capacitor charging is completed), the diode prevents the VCC terminal from discharging into the EM terminal. Further, Q1 is connected to a current sense resistor through the CS terminal of U1', allowing power switch to perform the normal regulating control function.

Thus, in embodiments of the present invention, the startup current, from Vin through startup resistor Rst, is amplified by power switch Q1. In some embodiments, the amplification factor β is 10 or more. As a result, the startup time is reduced, and the startup speed of the controller circuit is increased.

Figure 3:
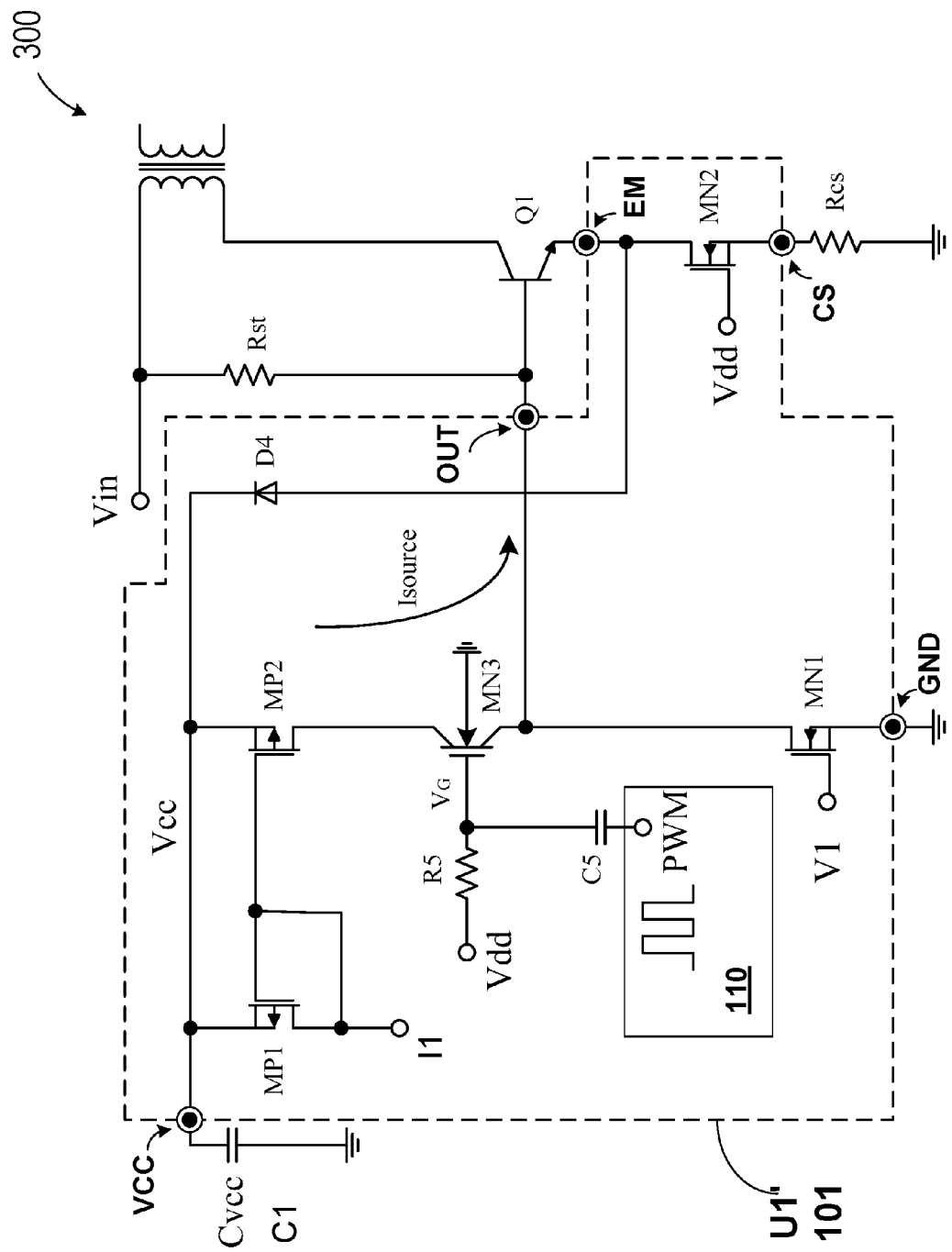
FIG. 3 illustrates a schematic diagram of a fast startup circuit in a portion of the switching power supply according to an embodiment of the present invention.

FIG. 3 illustrates a schematic diagram of a fast startup circuit in a portion of the switching power supply 200 of FIG. 2 according to an embodiment of the present invention. As shown, circuit 300 depicts the fast startup circuit in controller U1', which is shown in a block outlined in broken lines and is also labeled controller 101. Five terminals of controller 101 are shown in FIG. 3, OUT, EM, VCC, CS, and GND. A sixth terminal, FB, is not shown.

As shown in FIG. 3, controller 101 includes:
a first NMOS transistor MN1, the gate, source, and drain of MN1 being connected to a bias voltage V1, a reference ground GND, and the base of power switch Q1, respectively;
a second NMOS transistor MN2, the gate and drain of MN2 being connected to an internal power supply Vdd and the the emitter of Q1, and its source being connected through a first resistor (the current sense resistor) Rcs to reference ground; and
a third NMOS transistor MN3, the gate of MN3 being connected to an internal power supply Vdd, its source being connected to a common node between Rst and the base of Q1, and its drain being connected to a current mirror.

As shown in FIG. 3, the substrates in the first NMOS transistor MN1 and the second NMOS transistor MN2 are connected to their respective source terminals. The substrate of the third NMOS transistor MN3 substrate is connected to ground. The emitter of power switch Q1 is connected to startup capacitor Cvcc (also shown as C1 in FIGS. 1 and 2) through a diode D4. As shown in FIG. 2 and FIG. 3, the EM and CS terminal of controller U1' are connected through the second NMOS transistor MN2.

During startup, the input voltage Vin provides a startup current through the startup resistor Rst. The startup current is fed into the base of power switch Q1, which amplifies the startup current. The amplified startup current flows through diode D4 to the VCC terminal and charges capacitor Cvcc. At this time, the voltage at Cvcc has not yet reached the turn-on voltage of controller U1'. As a result, internal voltage Vcc has not yet been established. Therefore, NMOS transistors MN1, MN2, and MN3 are all turned off. Therefore, there is no leakage current a the base and emitter of Q1. Further, terminals EM and CS of controller U1' are not connected.

As shown in FIG. 3, controller U1' also has a current mirror made of a first PMOS transistor MP1 and the second PMOS transistor MP2. The gate and source of MP1 are connected to the gate and source of MP2, respectively. Moreover, the source of MP1 and MP2 and their respective substrate are connected to capacitor Cvcc, which, in turn, is connected to a ground. The gate and drain of the first PMOS transistor MP1 are connected to a current source I1. The drain of the second PMOS transistor MP2 is connected with the drain of the third NMOS transistor MN3. Note that, in an embodiment of the invention, the base of the power switch Q1 is not directly connected to the drain PMOS transistor MP2. Otherwise, the startup current through startup resistor Rst can flow through the second body diode of the PMOS transistor MP2 charge capacitance Cvcc, instead of flowing into the base of Q1 and being amplified. Therefore, in an embodiment, the base of Q1 and the drain of MP2 are separated by a third NMOS transistor MN3, whose substrate is grounded. In this embodiment, the substrate of MN3 is grounded to prevent the startup current from flowing through MN3 and MP2 and bypassing the amplification of Q1, which may occur if the substrate and the source of MN3 are connected together.

After the startup phase, the controller enters a normal operating phase, in which power switch Q1 is used in regulating the output of the power supply. Here, embodiments of the invention include provisions to prevent startup resistor Rst, which is connected to the base of Q1, from interfering with the output regulating function of the controller. In the normal operating phase, an internal voltage Vdd in controller U1' is established, and the second NMOS transistor MN2 and the third NMOS transistor MN3 are turned on. As shown in FIG. 3, the emitter of Q1 is connected to ground through the on-resistance of NM2 and the current sense resistor Rcs, both having relatively low resistance values. Therefore, the voltage at the emitter of Q1, and at terminal EM, is lower than the controller operating voltage Vcc. Under this condition, diode D4 is reverse-biased, and the startup circuit stops working. Q1 is used for normal output regulating function, with Rcs used for controlling the peak power output.

As shown in FIG. 3, a pulse generating circuit 110 produces a control signal, PWM (pulse width modulation signal). When PWM is asserted low, the second PMOS transistor MP2 is turned off, the first NMOS transistor MN1 is turned on under a bias voltage V1, and the base of Q1 is connected to ground through MN1. As a result, Q1 is turned off. When the PWM signal is high, the first NMOS transistor MN1 is turned off by bias voltage V1, and the second PMOS transistor MP2 is turned on. Current source I1, through MP2 and MN3, provide a current Isource to the base Q1 to turn on power switch Q1. Here, pulse generating circuit 110 may include a conventional PWM control circuit, which generates the PWM control signal in response to feedback signals representative of the output conditions and other control parameters.

As shown in FIG. 3, controller 101 (or U1') further includes an RC pump circuit coupled to the gate of MN3 for providing a drive current to Q1 when the PWM signal is high. Often, a large current is required to drive power switch Q1. In some embodiments, and is provided by a current amplifier circuit, i.e. an RC pump circuit. In FIG. 3, the RC pump circuit includes a resistor R5 and a capacitor C5. Resistor R5 is connected in series with internal power supply Vdd and the gate of MN3. Capacitor C5 connects the PWM control signal to a common node between resistor R5 and the gate of MN3. RC pump circuit is configured to increase the drive current by several folds, thus greatly reducing the size of MN3, thereby reducing controller layout area and chip size. Q1 is turned on and off in response to the PWM signal, through additional processing including provisions for Rst being connected to the base of Q1. More details are provided below with reference to FIG. 4.

Figure 4:
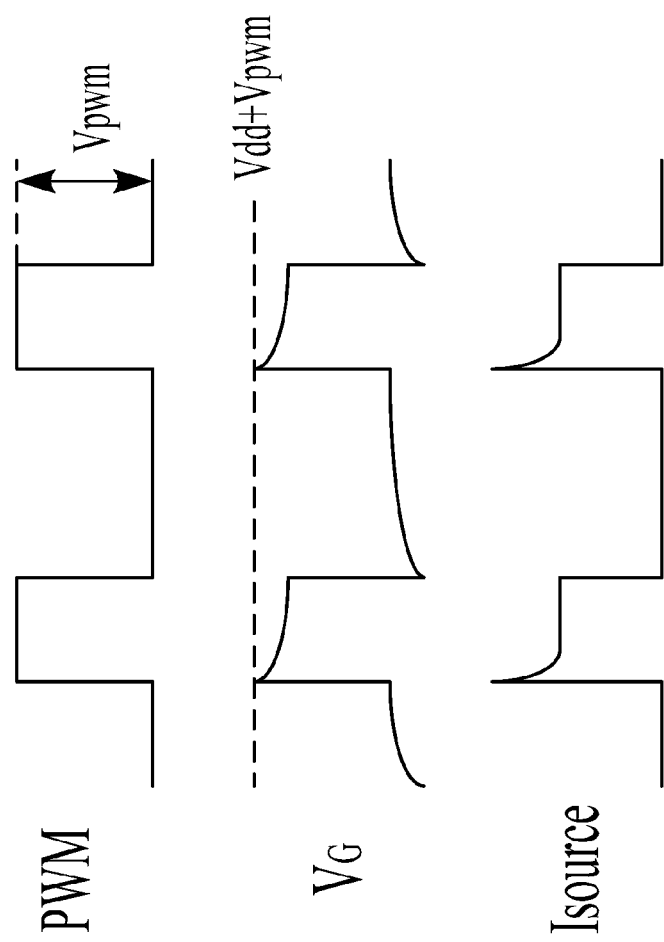
FIG. 4 illustrates waveforms of selected signals in the fast startup circuit in a portion of the switching power supply of FIG. 3 according to an embodiment of the present invention.

FIG. 4 illustrates waveforms of certain signals in the fast startup circuit in a portion of the switching power supply of FIG. 3 according to an embodiment of the present invention. In FIG. 4, PWM is the PWM control signal provided by pulse signal generating circuit 110, $V_G$ represents the gate voltage of MN3, and Isource is the current flowing into the base of power switch Q1. As shown in FIG. 4, when the PWM signal is low, $V_G$ is equal to Vdd, and MP2 is off. As a result, Isource is zero. When the PWM signal is high, $V_G$ is equal to the sum of Vdd and the PWM signal Vpwm. At this time, MP2 is turned on, and Isource, which is derived from the current mirror, is provided to the base of Q1. As a result, Q1 is responsive to the PWM signal through the amplified current signal Isource.

Note that, in some embodiments, the operating voltage Vcc of controller U1' can be high, and can reach tens of volts. In the startup phase, the base voltage of Q1, expressed as $V_{CC}+2\times V_{Df}$, can also be very high, e.g., more than ten to twenty volts. In the above expression, $2*V_{Df}$ is the sum of the voltage drop of diode D4 and the base-emitter voltage of MN3. Therefore, in some embodiments, the source of MN3 is selected to withstand high voltage. After the startup, the drain of MN3 is connected to Vcc, and therefore, needs to have high voltage capability. Therefore, in an embodiment of the present invention, NMOS transistor MN3 is a symmetric high-voltage transistor, with high-voltage source and drain.

In another embodiment of the present invention, the fast startup controller can be used to drive different types of power switch Q1. For example, controller 101 described above can be used to drive either an NPN bipolar power switch or an NMOS power switch. To drive an NPN power switch, a current signal is provided to the control terminal (base) of the NPN switch. However, to drive an NMOS power transistor, a voltage signal is needed to the control terminal, or gate terminal, of the NMOS. In conventional switching power supplies, the controller designed for providing the current signal to the NPN power switch often does not provide sufficient voltage needed to drive an NMOS power transistor. Therefore, conventional power controllers for driving an NPN power switch usually cannot be used to drive an NMOS power switch. However, the controller provided by embodiments of the invention is capable of driving both NPN power transistors and NMOS power transistors, as described in more detail below.

Figure 5:
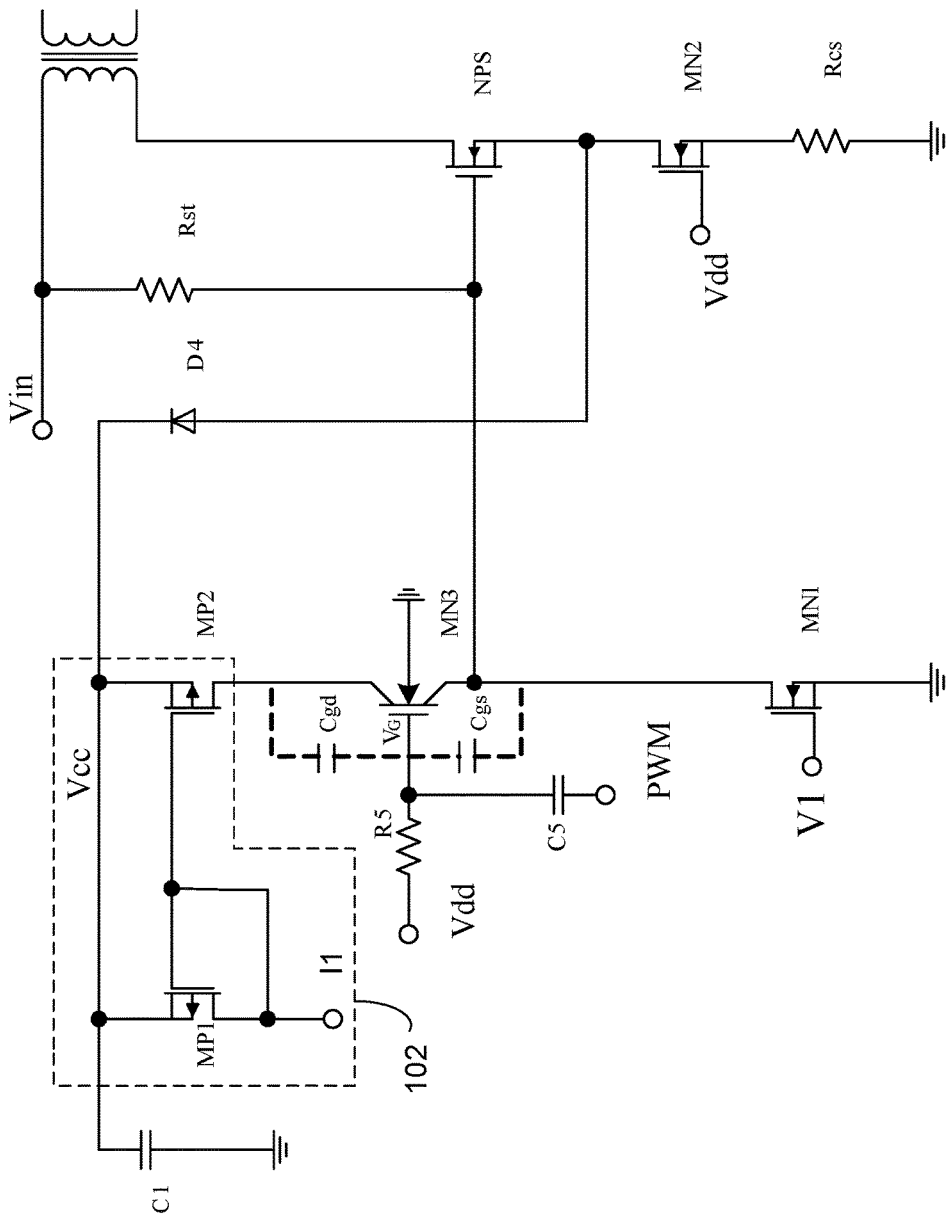
FIG. 5 illustrates a schematic diagram of a fast startup circuit in a portion of the switching power supply according to an embodiment of the present invention.

FIG. 5 illustrates a schematic diagram of a fast startup circuit in a portion of the switching power supply according to an embodiment of the present invention. As shown, FIG. 5 is similar to FIG. 3, but with bipolar power switch Q1 in FIG. 3 replaced with an NMOS power switch NPS in FIG. 5, and with additional notations associated with NMOS transistor MN3 marking parasitic capacitances Cgd and Cgs, the gate-to-drain capacitance and gate-to-source capacitance of MN3. In addition, current mirror 102 is shown to include two PMOS transistors MP1 and MP2. As explained below, in embodiments of the present invention, parasitic capacitance Cgd and Cgs play a role as charge pumps that can elevate the gate potential of MN3, thus providing the drive voltage necessary to drive an NMOS power switch NPS.

In the following examples, the gate voltage of the driving NMOS transistor is estimated for a conventional circuit versus for the embodiments shown in FIGS. 3 and 5. It is assumed that, in MN3, the capacitance of the oxide layer between the gate and channel is $C_1=WLCox=20$ pF, and the gate-source overlap capacitance=$W*Cov=5$ pF. Further, Vgo denotes the gate voltage of MN3, Vd is the drain voltage, and Vs is the source voltage.

In a conventional driving circuit,
Condition 1: PWM=0, Vg0=3.5V, Vd=0V, Vs=0V, and transistor in deep linear region.
Cgs0=Cgd0=½*C1+W*Cov=15 pF,
Charges on $C_1$: $Q_{C1}=V_{g0} \cdot C_1$
Charges on $C_{gs}$: $Q_{Cgs}=V_{g0} \cdot C_{gs0}$
Charges on $C_{gd}$: $Q_{Cgd}=V_{g0} \cdot C_{gd0}$ Condition 2: PWM=1, Vd=2V, Vs=1.5V, and transistor in deep linear region.
Cgs=Cgd=½*C1+W*Cov=15 pF
Charges on $C_1$: $Q_{C1}=(V_g-Vdd)\cdot C_1$
Charges on $C_{gs}$: $Q_{Cgs}=(V_g-V_s)\cdot C_{gs}$
Charges on $C_{gd}$: $Q_{Cgd}=(V_g-V_d)\cdot C_{gd}$
According to the conservation of charges, $$V_{g0}\cdot C_1 + V_{g0}\cdot C_{gs0} + V_{g0}\cdot C_{gd0} =$$
$$(V_g-Vdd)\cdot C_1 + (V_g-V_s)\cdot C_{gs0} + (V_g-V_d)\cdot C_{gd0}$$
$$V_g = V_{g0} + \frac{Vdd\cdot C_1 + V_s\cdot C_{gs0} + V_d\cdot C_{gd0}}{C_1 + C_{gs0} + C_{gd0}}$$
$$V_g = 3.5 + \frac{3.5\cdot 30 + 1.5\cdot 15 + 2\cdot 15}{30+15+15} = 6.1 \text{ V}$$

It can be seen that Vg is at 6.1V, with the conventional driving circuit arrangement PWM=1, Vd=2V, and Vs=1.5V.

In embodiments of the invention, internal parasitic capacitances in MN3, Cgd and Cgs, play a role as charge pumps, raising the gate potential of MN3.
Condition 1: PWM=0 Vg0=3.5V, Vd=0V, Vs=0V, and MN3 in deep linear region.
Cgs0=Cgd0=½*C1+W*Cov=15 pF
Charges on $C_1$: $Q_{C1}=V_{g0}\cdot C_1$
Charges on $C_{gs}$: $Q_{Cgs}=V_{g0}\cdot C_{gs0}$
Charges on $C_{gd}$: $Q_{Cgd}=V_{g0}\cdot C_{gd0}$
Condition 2: PWM=1, Vd=12V, Vs=6V, and MN3 in saturation region.
Cgs=⅔*C1+W*Cov=18.5 pF
Cgd=⅓*C1+W*Cov=11.5 pF
Charges on $C_1$: $Q_{C1}=(V_g-Vdd)\cdot C_1$
Charges on $C_{gs}$: $Q_{Cgs}=(V_g-V_s)\cdot C_{gs}$
Charges on $C_{gd}$: $Q_{Cgd}=(V_g-V_d)\cdot C_{gd}$
According to the conservation of charges, $$V_{g0}\cdot C_1 + V_{g0}\cdot C_{gs0} + V_{g0}\cdot C_{gd0} =$$
$$(V_g-Vdd)\cdot C_1 + (V_g-V_s)\cdot C_{gs} + (V_g-V_d)\cdot C_{gd}$$
$$V_g = V_{g0}\frac{C_1+C_{gs0}+C_{gd0}}{C_1+C_{gs}+C_{gd}} + \frac{Vdd\cdot C_1 + V_s\cdot C_{gs} + V_d\cdot C_{gd}}{C_1+C_{gs}+C_{gd}}$$
$$C_{gs0}+C_{gd0} = C_{gs}+C_{gd}$$
$$V_g = V_{g0} + \frac{Vdd\cdot C_1 + V_s\cdot C_{gs} + V_d\cdot C_{gd}}{C_1+C_{gs}+C_{gd}}$$

Under steady state condition, the current in the driving current is zero. The Vds of MP2 is approximately zero, and the drain voltage Vd of MN3 is Vd≈Vcc. The gate voltage Vg of MN3 can be calculated with the following parameters, C5=30 pF, Cgs0=Cgd0=15 pF, Cgs=20 pF, Cgd=10 pF, Vdd=3.5V, Vd=Vcc=10V, Vs=6V, $$V_g = 3.5 + \frac{3.5+30+6\cdot 18.5 + 10\cdot 11.5}{30+18.5+11.5} = 9.0 \text{ V}$$

Taking into account the effect of substrate bias, the source voltage of MN3 Vs would be about 7V, sufficient to drive an MOS power switch.

It can be seen that with the PWM drive circuit described above in connection with FIGS. 3 and 5, the gate voltage Vg of MN3 is elevated, and the source voltage Vs of MN3 is sufficiently high to drive an MOS power switch. Therefore, the controller provided by embodiments of the invention is capable of driving both NPN power transistors and NMOS power transistors. In the embodiment shown in FIG. 5, the PWM drive circuit includes:
- an input terminal for receiving a PWM pulse control signal;
- an output terminal for coupling to a power switch;
- a current mirror having a first PMOS transistor MP1 and a second PMOS transistor MP2, the first PMOS transistor MP1 being coupled to a current source I1;
- an NMOS drive transistor MN3 coupled to the second PMOS transistor MP2 and a NMOS switch transistor MN1 which receive a bias signal V1, a substrate of MN3 being grounded;
- an RC pump circuit including a resistor R5 and a capacitor C5, capacitor C5 being coupled to the input terminal to receive the PWM pulse control signal, a common node between R5 and C5 being connected to the gate of MN3;
- the source terminal of MN3 connected to the output terminal for coupling to a power switch.

While the above is a description of specific embodiments of the invention, the above description should not be taken as limiting the scope of the invention. For example, even though the examples described herein are directed towards an NPN power switch and an NMOS power switch, it is understood that those skilled in the art can transform the circuit to work with PNP or PMOS power switches. Therefore, it is appreciated that the examples and embodiments described herein are for illustrative purposes only and that various modifications or changes in light thereof will be suggested to persons skilled in the art and are to be included within the spirit and purview of this application.

What is claimed is:

1. A controller for a switch mode power supply (SMPS), the controller comprising:
   a first terminal for coupling to a startup resistor and to a control terminal of a power switch which is coupled to a primary winding of the power supply;
   where the controller is configured:
   during a startup, to cause the power switch to amplify a startup current from an external input voltage through the startup resistor and provide a startup power to the controller; and
   during a normal operation, to provide a power switch control signal to turn on and off the power switch for controlling a current flow in the primary winding and regulating an output of the power supply.

2. The controller of claim 1, further comprising:
   a second terminal for coupling to an output terminal of the power switch;
   a third terminal for coupling to the startup capacitor;
   a fourth terminal for coupling to a current sense resistor;
   a transistor coupled between the second terminal and the fourth terminal; wherein, during the startup phase, the transistor is turned off to isolate the power switch from the current sense resistor; and
   a rectifying diode coupled between the second terminal and the third terminal to separate the power switch from the startup capacitor during normal operation.

3. The controller of claim 2, further comprising:
   a pulse generation circuit for providing a pulsed control signal; an RC pump circuit including a resistor coupled to a capacitor at a common node, the resistor being coupled to a first bias voltage, the capacitor being configured to receive the pulsed control signal; and a drive transistor having a gate coupled to the common node, and a source of the drive transistor coupled to the power switch to control the power switch for regulating an output of the power supply.

4. The controller of claim 3, wherein the power switch is either an NPN power switch or an NMOS power switch, wherein the controller is configured to provide a current signal for driving the NPN power switch, and the controller is configured to provide a voltage signal for driving the NMOS power switch.

5. The controller of claim 3, further comprising:
a current mirror coupled between the drive transistor and a voltage supply; and
a switch transistor coupled between the drive transistor and a ground.

6. A control circuit for a switch mode power supply (SMPS), the control circuit comprising:
a power switch for coupling to a primary winding of the power supply;
a startup resistor coupled to an external input voltage and also coupled to a control terminal of the power switch; and
a controller;
wherein:
during a startup phase, the controller is configured to cause the power switch to amplify a startup current from the external input voltage through the startup resistor and provide a startup power to the controller; and
during a normal operating phase, the controller is configured to provide a power switch control signal to turn on and off the power switch for controlling a current flow in the primary winding and regulating an output of the power supply.

7. The control circuit of claim 6, further comprising:
a second terminal for coupling to an output terminal of the power switch;
a third terminal for coupling to the startup capacitor;
a fourth terminal for coupling to a current sense resistor;
a transistor coupled between the second terminal and the fourth terminal; wherein, during the startup phase, the transistor is turned off to isolate the power switch from the current sense resistor; and
a rectifying diode coupled between the second terminal and the third terminal to separate the power switch from the startup capacitor during normal operation.

8. The control circuit of claim 6, further comprising a pulse generation circuit for providing a pulsed control signal; an RC pump circuit including a resistor coupled to a capacitor at a common node, the resistor being coupled to a first bias voltage, the capacitor being configured to receive the pulsed control signal; and
a drive transistor having a gate coupled to the common node, and a source of the drive transistor coupled to the power switch to control the power switch for regulating an output of the power supply.

9. The control circuit of claim 8, wherein the power switch is either an NPN power switch or an NMOS power switch, wherein the controller is configured to provide a current signal for driving the NPN power switch, and the controller is configured to provide a voltage signal for driving the NMOS power switch.

10. A switch mode power supply (SMPS), the power supply comprising:
a transformer having a primary winding, and a secondary winding, the primary winding for coupling to an external input voltage, the secondary winding for providing an output of the power supply to a load;
a power switch for coupling to the primary winding of the power supply; and
a startup resistor coupled to the external input voltage, the startup resistor also being coupled to a control terminal of the power switch.

11. The power supply of claim 10, further comprising:
a controller coupled to the power switch, wherein:
during a startup phase, the controller is configured to cause the power switch to amplify a startup current from an external input voltage through the startup resistor and provide a startup power to the controller; and
during a normal operating phase, the controller is configured to provide a power switch control signal to turn on and off the power switch for controlling a current flow in the primary winding and regulating an output of the power supply.

12. The power supply of claim 11, wherein:
during startup, the controller is configured to provide a current path for the amplified startup current to flow from an output of the power switch to charge up a startup capacitor and to provide the startup power to the controller; and
during normal operation, the controller is configured to separate the power switch from the startup capacitor, and to provide the power switch control signal by amplifying a pulsed control signal from a pulse signal generation circuit.

13. The power supply of claim 11, further comprising a pulse generation circuit for providing a pulsed control signal; an RC pump circuit including a resistor coupled to a capacitor at a common node, the resistor being coupled to a first bias voltage, the capacitor being configured to receive the pulsed control signal; and
a drive transistor having a gate coupled to the common node, and a source of the drive transistor coupled to the power switch to control the power switch for regulating an output of the power supply.

14. The power supply of claim 13, wherein the power switch is either an NPN power switch or an NMOS power switch, wherein the controller is configured to provide a current signal for driving the NPN power switch, and the controller is configured to provide a voltage signal for driving the NMOS power switch.

* * * * *